(12) United States Patent
Eisenhour

(10) Patent No.: US 8,013,458 B2
(45) Date of Patent: Sep. 6, 2011

(54) VEHICLE HEAT EXCHANGER ARRANGEMENT

(75) Inventor: Ronald S Eisenhour, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 379 days.

(21) Appl. No.: 12/355,417

(22) Filed: Jan. 16, 2009

(65) Prior Publication Data

US 2010/0181050 A1  Jul. 22, 2010

(51) Int. Cl.
*F25B 27/00* (2006.01)
(52) U.S. Cl. ............................................ 290/2; 290/1 R
(58) Field of Classification Search .................. 290/1 A, 290/2, 44, 55, 1 R; 322/1; 415/121.3; 180/2.2, 180/2.1, 165, 65.3
See application file for complete search history.

(56) References Cited

U.S. PATENT DOCUMENTS

| 7,669,557 | B2* | 3/2010 | Kojima ...................... 123/41.11 |
| 2003/0057708 | A1* | 3/2003 | Wu ................................. 290/55 |
| 2005/0122679 | A1* | 6/2005 | Von Gutfeld et al. ......... 361/687 |
| 2007/0193617 | A1 | 8/2007 | Taguchi |
| 2007/0227472 | A1 | 10/2007 | Takeuchi et al. |

FOREIGN PATENT DOCUMENTS

JP           2008-075597 A       4/2008

* cited by examiner

*Primary Examiner* — Tho D Ta
(74) *Attorney, Agent, or Firm* — Global IP Counselors, LLP

(57) ABSTRACT

A vehicle heat exchanger arrangement is provided basically with a heat exchanger, a pusher fan and a power recovery device. The heat exchanger has a first side and a second side. The pusher fan is disposed on the first side of the heat exchanger to push air through the heat exchanger to the second side. The power recovery device is disposed on the second side of the heat exchanger to receive the air pushed through the heat exchanger by the pusher fan such that the power recovery device generates electricity.

19 Claims, 5 Drawing Sheets

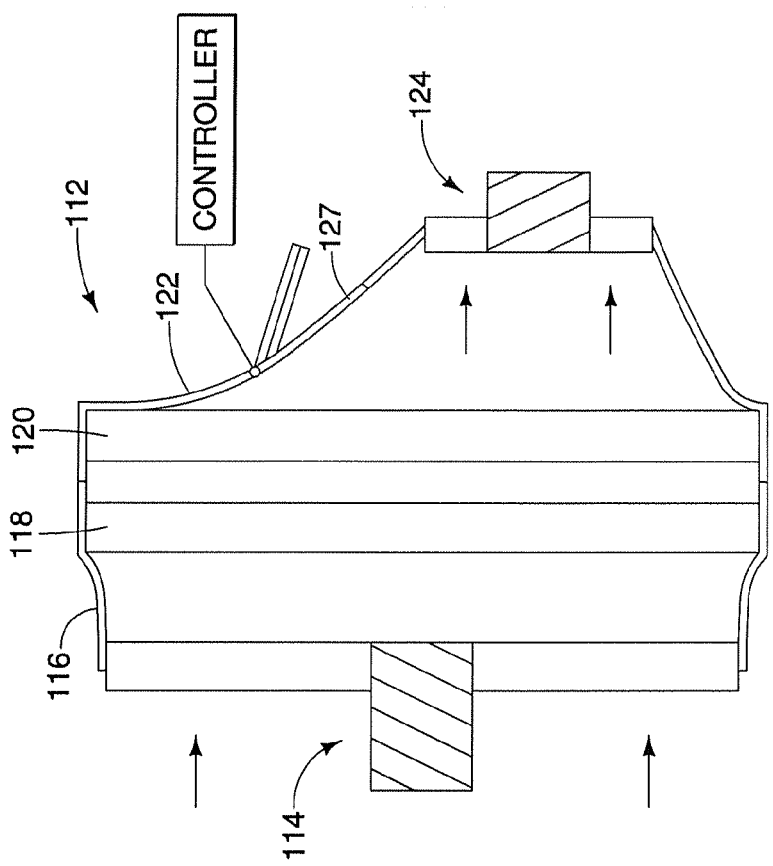
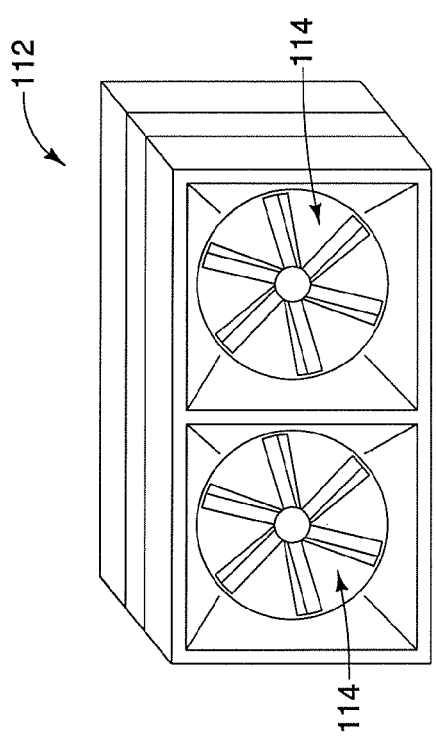
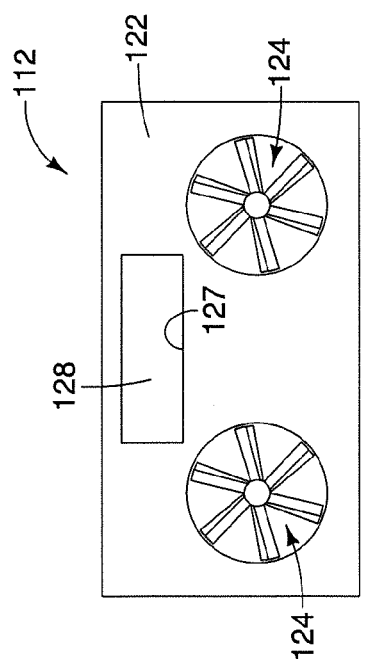

VEHICLE HEAT EXCHANGER ARRANGEMENT

BACKGROUND OF THE INVENTION

1. Field of the Invention

The present invention generally relates to a vehicle heat exchanger arrangement. More specifically, the present invention relates to recovering power from a cooling fan of a vehicle heat exchanger arrangement.

2. Background Information

In recent years, hybrid vehicles have become more popular. A hybrid vehicle includes an internal combustion engine and an electric motor or a battery as power sources for providing a driving force to a vehicle drive train. With hybrid vehicles, there is an increased need for generating electrical power. When the internal combustion engine is used, the vehicle will generate considerable waste heat during operation. This heat from engine needs to be dissipated or passed to the environment. The engine's coolant is one principle carrier of heat to the environment via a radiator typically placed forward in vehicle. In order to augment heat exchange, particularly at low vehicles speeds, a cooling fan is provided to increase airflow through the radiator. The cooling fan(s) has been historically located at the exit of the heat exchanger (behind the radiator). In some limited applications, a secondary fan is applied upstream of the heat exchanger to supplement airflow and heat transfer. Typically in a vehicle, this cooling action consumes electrical power of about 300 W during operation.

In view of the above, it will be apparent to those skilled in the art from this disclosure that there exists a need to recovery the power needed to operate a cooling fan to cool a heat exchanger, such as a radiator. This invention addresses this need in the art as well as other needs, which will become apparent to those skilled in the art from this disclosure.

SUMMARY OF THE INVENTION

It has been discovered that some of the power needed to operate a fan system to cool a heat exchanger, such as a radiator, can be recovered. In view of the state of the known technology, one object of the present invention is to provide a vehicle heat exchanger arrangement that recovers power from a cooling fan.

In accordance with one aspect of the present invention, a vehicle heat exchanger arrangement is provided basically with a heat exchanger, a pusher fan and a generator fan. The heat exchanger has a first side and a second side. The pusher fan is disposed on the first side of the heat exchanger to push air through the heat exchanger to the second side. The power recovery device is disposed on the second side of the heat exchanger to receive the air pushed through the heat exchanger by the pusher fan such that the power recovery device generates electricity.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 7 is a simplified front perspective view of a vehicle heat exchanger arrangement in accordance with a second embodiment;

FIG. 8 is a simplified rear elevational view of the vehicle heat exchanger arrangement illustrated in FIG. 7; and FIG. 9 is a simplified cross sectional view of the vehicle heat exchanger arrangement illustrated in FIGS. 7 and 8.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
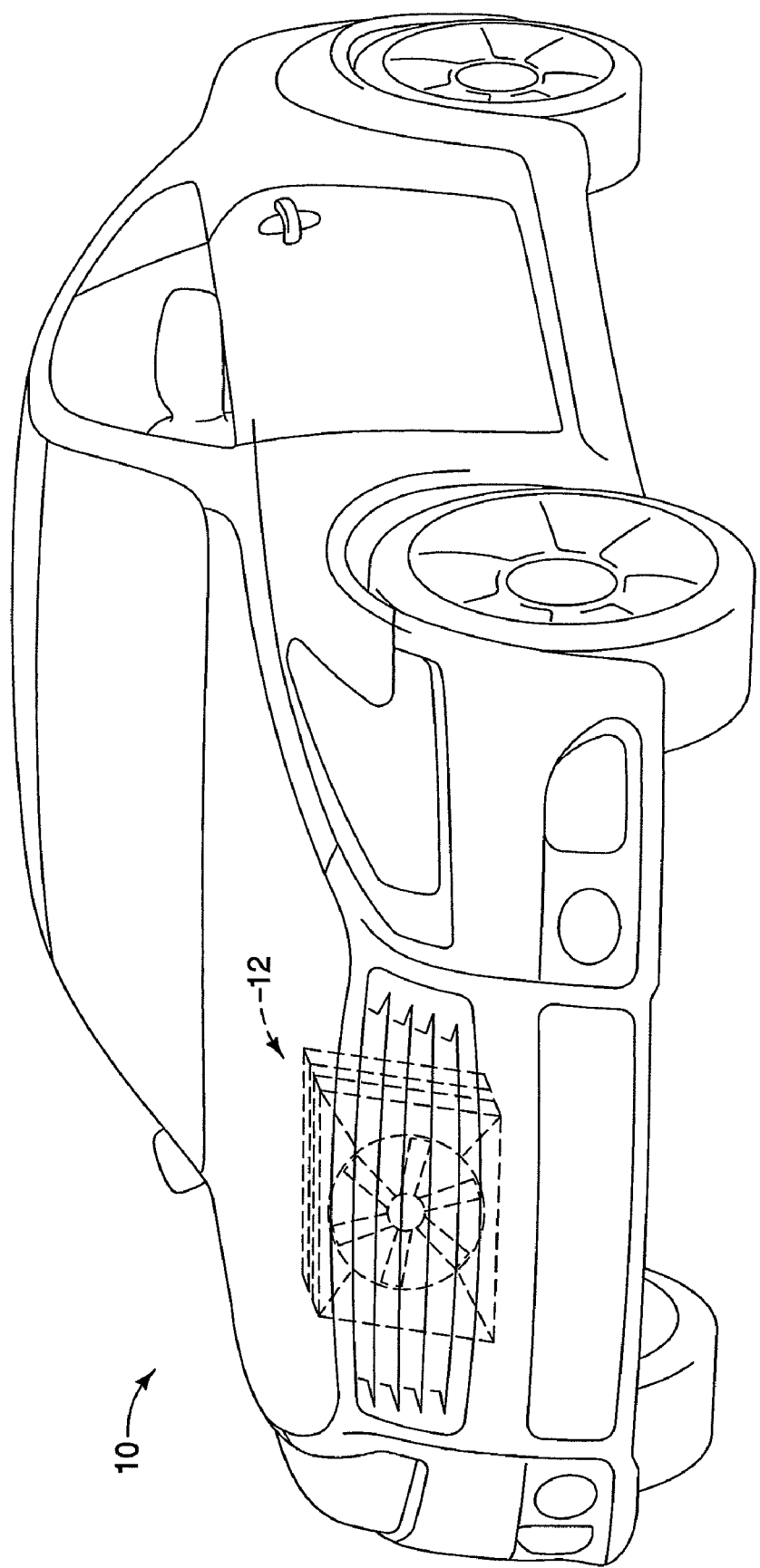
FIG. 1 is a front perspective view of a vehicle equipped with a vehicle heat exchanger arrangement in accordance with a first embodiment.

Referring initially to FIG. 1, a vehicle 10 is illustrated with a vehicle heat exchanger arrangement 12 in accordance with a first embodiment. The vehicle heat exchanger 12 is preferably located at the front of the vehicle 10 behind its grill so as to receive fresh air. Basically, the vehicle heat exchanger 12 is a part of an engine cooling system and a part of an HVAC system of the vehicle 10. Since engine cooling systems and HVAC systems are well known, these systems will not be discussed and/or illustrated in detail herein. As discussed below in more detail, the vehicle heat exchanger arrangement 12 is used to recover electrical power used in the process of cooling the engine coolant of the engine cooling system and cooling the refrigerant of the HVAC system of the vehicle 10.

Figure 2:
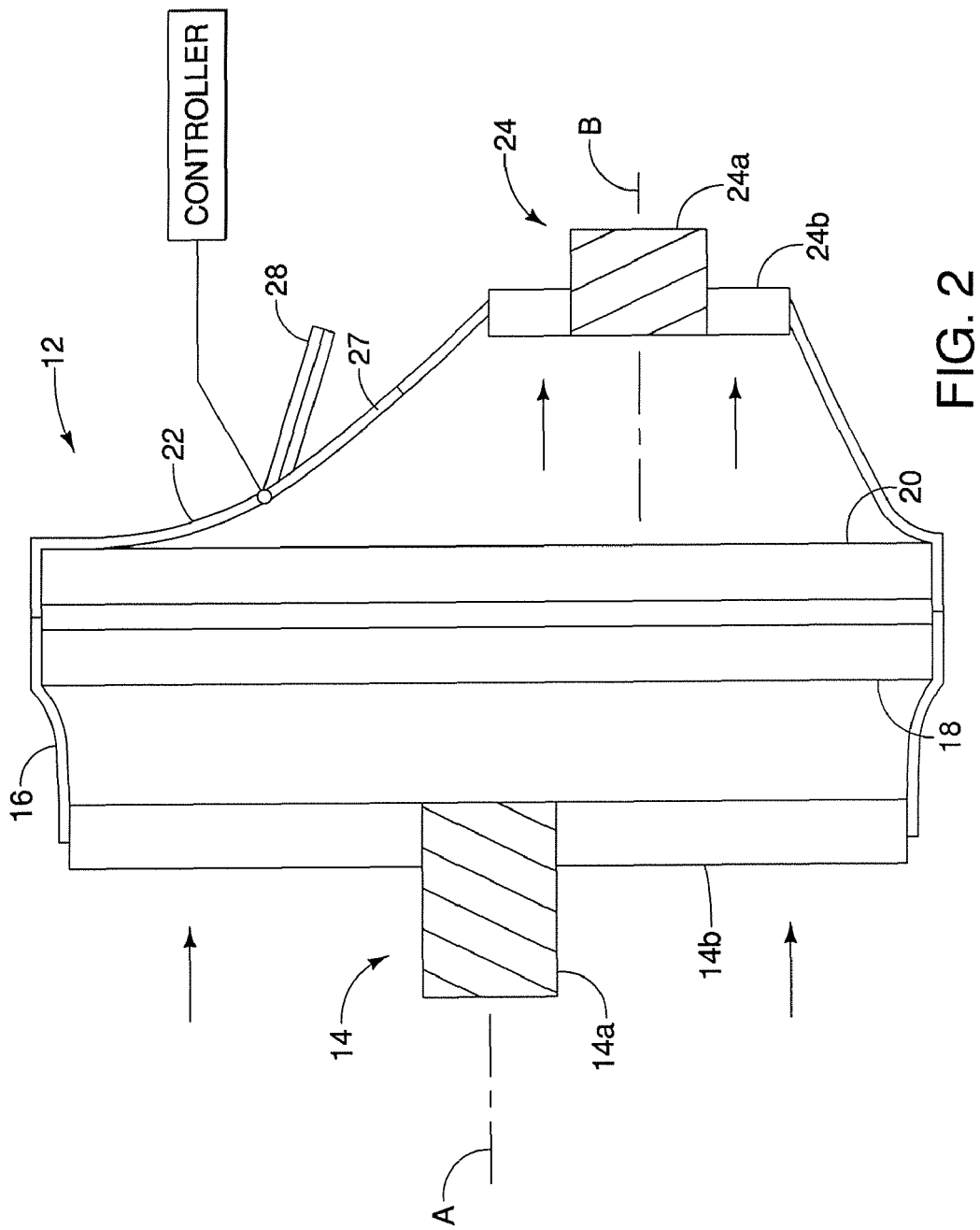
FIG. 2 is a simplified cross sectional view of the vehicle heat exchanger arrangement in accordance with the first embodiment that is used as part of an engine cooling and an HVAC system of the vehicle illustrated in FIG. 1.
Figure 3:
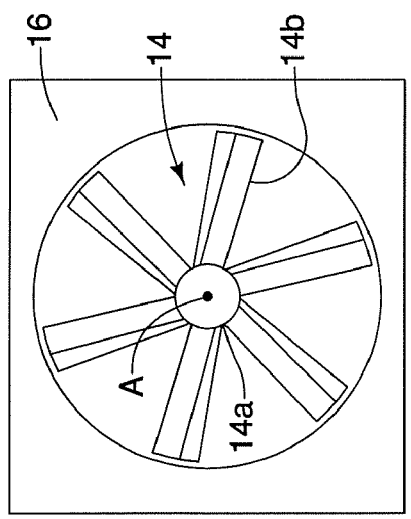
FIG. 3 is a simplified front elevational view of the vehicle heat exchanger arrangement illustrated in FIGS. 1 and 2.
Figure 4:
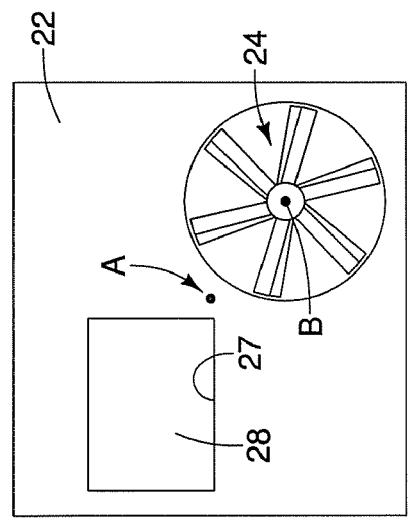
FIG. 4 is a simplified rear elevational view of the vehicle heat exchanger arrangement illustrated in FIGS. 1 to 3.

As seen in FIGS. 2 to 4, the vehicle heat exchanger arrangement 12 is provided basically with a pusher fan 14, a pusher fan shroud 16, a condenser 18, an engine radiator 20, a generator fan shroud 22 and a generator fan 24. The condenser 18 and the engine radiator 20 are conventional heat exchangers that are cooled by the air forced through them by the pusher fan 14. By placing a strong pusher fan 14 at the entrance to the pusher fan shroud 16 for the condenser 18 and the engine radiator 20, the relatively cool/dense air will be forced into the condenser 18 and the engine radiator 20. The generator fan 24 acting as a power recovery fan is located at the air path exit of the engine radiator 20 to receive the heated and less dense air. The heated and less dense air will then operate the generator fan 24 as a generator. It is desirable to use the generator fan shroud 22 to focus the air into the generator fan 24, in order to enhance velocities and utilize the total exiting airflow.

Turning back to FIG. 2, each of the heat exchangers (i.e., the condenser 18 and the engine radiator 20) has a front or first side and a rear or second side. The pusher fan 14 is disposed on the front or first sides of the condenser 18 and the engine radiator 20 to push air through the condenser 18 and the engine radiator 20 to the rear or second sides of the condenser 18 and the engine radiator 20. The generator fan 24 is disposed on the second sides of the condenser 18 and the engine radiator 20 to receive the air pushed through the condenser 18 and the engine radiator 20 by the pusher fan 14 such that the generator fan 24 to generate electricity.

Figure 5:
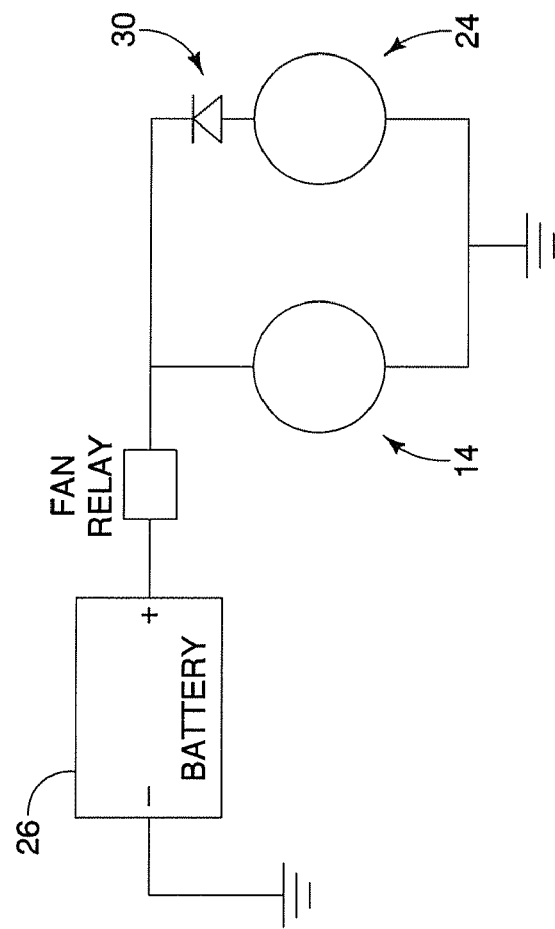
FIG. 5 is a simplified circuit diagram for the vehicle heat exchanger arrangement illustrated in FIGS. 1 to 4.

The pusher fan 14 is an electrically operated fan that has an electric motor 14a and a plurality of fan blades 14b. As seen in FIG. 5, the electric motor 14a is electrically coupled to a battery 26 of the vehicle 10 for receiving electrical power. The electric motor 14a rotates the fan blades 14b to force air through the condenser 18 and the radiator 20.

The pusher fan shroud 16 extends from around the ends of the fan blades 14b to the condenser 18 and/or the radiator 20. In other words, the pusher fan shroud 16 at least partially enclosing a space between the pusher fan 14 and the first or front side of the condenser 18 and the radiator 20. Typically, the condenser 18 is smaller than the radiator 20 such that the pusher fan shroud 16 directs some of the air from the pusher fan 14 directly through the radiator 20. In any event, the pusher fan shroud 16 is configured and arranged such that the air from the pusher fan 14 passes through the condenser 18 and the radiator 20.

The condenser 18 receives the refrigerant of the HVAC system of the vehicle 10, while the engine radiator 20 receives the engine coolant of the engine cooling system of the vehicle 10. In other words, the condenser 18 constitutes a heat exchanger that receives a refrigerant that is circulated through the HVAC system of the vehicle 10, while the engine radiator 20 constitutes a heat exchanger that receives a liquid coolant that is circulated through the engine of the vehicle 10. Thus, the refrigerant and the engine coolant are cooled by the air forced through them by the pusher fan 14. Since condenser 18 and the radiator 20 are well known types of heat exchangers, these heat exchangers will not be discussed and/or illustrated in detail herein.

The generator fan shroud 22 extends from the radiator 20 to the generator fan 24. Thus, the generator fan shroud 22 at least partially encloses a space between the second side of the radiator 20 and the generator fan 24. The generator fan shroud 22 funnels the air forced through the condenser 18 and the radiator 20 by the pusher fan 14 to the generator fan 24. Preferably, the generator fan shroud 22 includes a bypass outlet 27 and a bypass member or flap 28. The bypass flap 28 is arranged to discharge the air pushed through the condenser 18 and the radiator 20 by the pusher fan 14 out the bypass outlet 27 so that at least some of the air bypasses the generator fan 24. The bypass flap 28 allows for less exit pressure restriction and more radiator airflow/cooling effect. Thus, the bypass flap 28 is added to help satisfy high cooling demand conditions. The bypass flap 28 is typically closed, except for high cooling demand conditions. The bypass flap 28 can be automatically operated by a controller based on prescribed engine operating conditions that are indicative of high cooling demand conditions.

The generator fan 24 is a power recovery device that is disposed on the rear or second sides of the condenser 18 and the engine radiator 20 to receive the air pushed through the condenser 18 and the engine radiator 20 by the pusher fan 14. The generator fan 24 is an electrically operated fan that has an electric motor/generator 24a and a plurality of fan blades 24b. As seen in FIG. 5, the electric motor/generator 24a is electrically coupled to the battery 26 that stores electrical power generated by the electric motor/generator 24a. The fan blades 24b are rotated by the air forced through the condenser 18 and the radiator 20 such that the electric motor/generator 24a is rotated to generate electricity. In other words, the generator fan 24 generates electricity in response to the air rotating blades of the generator fan 24. In the illustrated embodiment, the generator fan 24 has a smaller effective cross-sectional area than an effective cross-sectional of the pusher fan 14. Also the pusher fan 14 has a center rotational axis A that is offset from a center rotational axis B of the generator fan 24 as best seen in FIG. 2.

Figure 6:
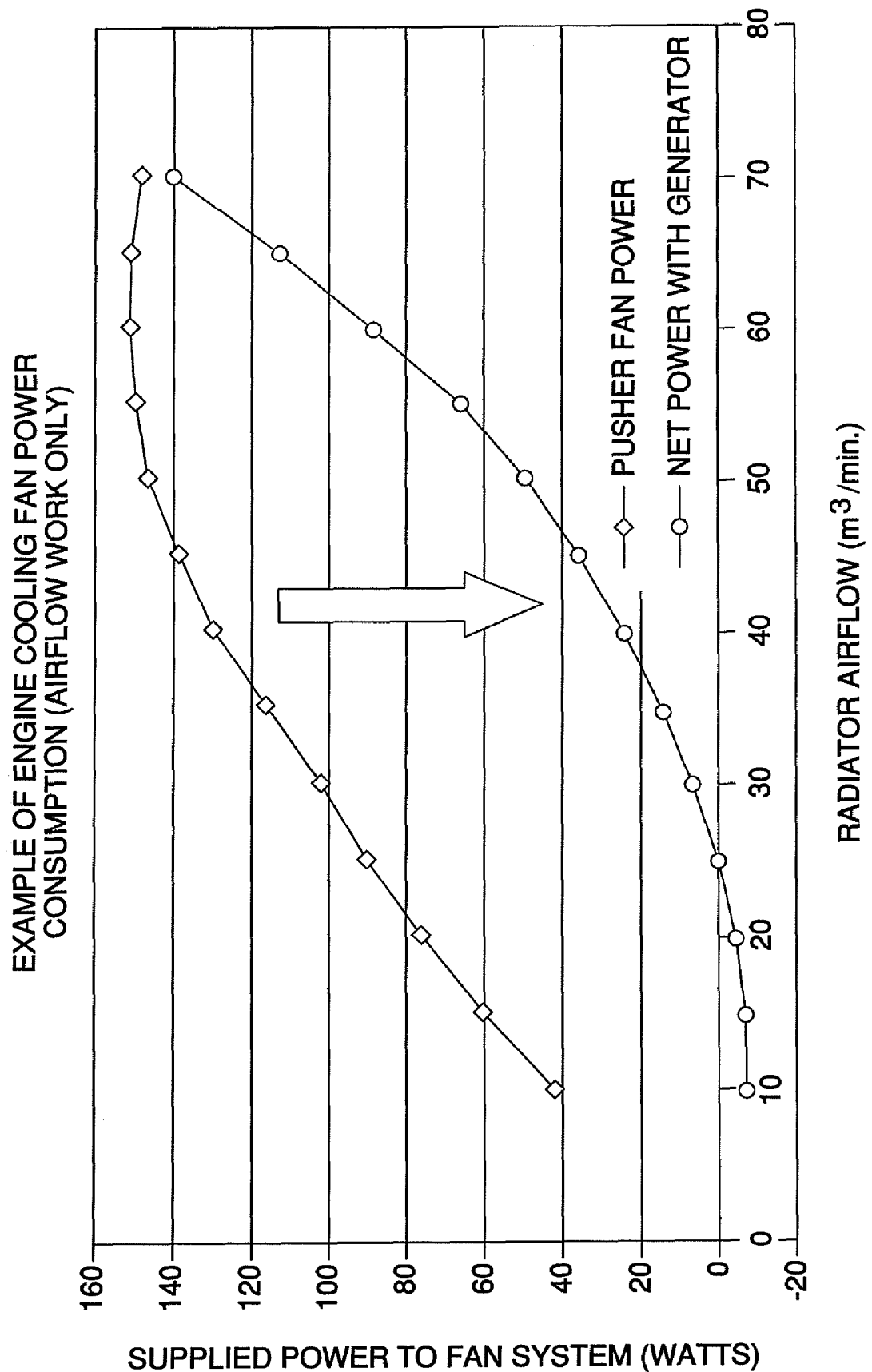
FIG. 6 is a simplified graph illustrating an example of an engine cooling fan power consumption when using the vehicle heat exchanger arrangement illustrated in FIGS. 1 to 5.

Basically, as seen in FIG. 5, an electrical interface circuit is shown in which the electric motor/generator 24a of the generator fan 24 is electrically coupled to the electric motor 14a of the pusher fan 14 to supply electrical power generated by the electric motor/generator 24a of the generator fan 24 to the electric motor 14a of the pusher fan 14. The electric motor 14a of the pusher fan 14 and the electric motor/generator 24a of the generator fan 24 are part of a DC voltage electrical circuit in which the electric motor 14a of the pusher fan 14 and the electric motor/generator 24a of the generator fan 24 are connected in parallel. In this DC motor/generator configuration, the electric motor/generator 24a of the generator fan 24 is selected to generate higher voltage than that of the electric motor 14a of the pusher fan 14. Thus, the electric motor/generator 24a of the generator fan 24 can feed electrical current into the circuit of the electric motor 14a of the pusher fan 14 via a diode 30 so as to reduce the electrical load of the cooling fan system. The electric motor/generator 24a is not to be driven by this system, so the current is stopped by the diode 30. When the electric motor/generator 24a creates voltage greater than the system, the electric motor/generator 24a sends current into the pusher fan motor circuit to offset the need to load the vehicle electrical system. Thus, as seen in FIG. 6, the electricity generated by the electric motor/generator 24a can reduce the amount of watts required to operate the electric motor 14a of the pusher fan 14.

Referring now to FIGS. 7 to 9, a vehicle heat exchanger arrangement 112 is illustrated in accordance with a second embodiment. The vehicle heat exchanger arrangement 112 is provided basically with a pair of pusher fans 114, a pusher fan shroud 116, a condenser 118, an engine radiator 120, a generator fan shroud 122 and a pair of generator fans 124. Basically, the vehicle heat exchanger arrangement 112 is the same as the vehicle heat exchanger arrangement 12 of the first embodiment, except that the vehicle heat exchanger arrangement 112 has been configured to accommodate two pusher fans 114 and two generator fans 124. The components of the vehicle heat exchanger arrangement 112 that have the same name as the vehicle heat exchanger arrangement 12 have the same functions as discussed above. Thus, the components of the vehicle heat exchanger arrangement 112 will not be discussed in detail herein for the sake of brevity.

Preferably, the generator fan shroud 122 includes a bypass outlet 127 and a bypass member or flap 128 similar to the bypass flap 28 of the first embodiment. Also the pusher fans 114 and the generator fans 124 are electrically connected to the vehicle's battery with either a single circuit or two circuits similar to the circuit shown in FIG. 5. Thus, the generator fans 124 are disposed on the second or rear sides of the engine radiator 120 to receive the air pushed through the engine radiator 120 by the pusher fan 114 such that the generator fans 124 generates electricity in response to the air rotating blades of the generator fans 124. Accordingly, multiple pusher fans and generator (power recovery) fans could be applied to any single heat exchanger or combination of heat exchangers in the vehicle.

Moreover, the vehicle heat exchanger arrangements can be applied to other heat exchangers including, but not limited to, an exhaust heat exchanger, an engine oil cooler, and a transmission oil cooler. Also instead of using generator fans as a power recovery device, air compressors and/or expanders could be used in place of the fans as a power recovery device to recover power.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle heat exchanger arrangement comprising:
a shroud having an inlet, an outlet and a bypass outlet;
a heat exchanger disposed within the shroud having a first side facing the inlet and a second side facing the outlet and the bypass outlet;
a pusher fan disposed at the inlet of the shroud to push air through the heat exchanger to the outlet;
a power recovery device disposed at the outlet of the shroud to receive the air pushed through the heat exchanger by the pusher fan such that the power recovery device generates electricity;
a bypass member disposed over the bypass outlet and configured to move between a closed position covering the bypass outlet and an open position, the bypass member being arranged to selectively discharge the air pushed through the heat exchanger by the pusher fan out of the bypass opening; and
a controller configured to automatically operate the bypass member in response to cooling demand conditions.

2. The vehicle heat exchanger arrangement to claim 1, wherein
the shroud includes a pusher fan shroud section at least partially enclosing a space between the pusher fan and the first side of the heat exchanger, the pusher fan shroud section defining the inlet of the shroud.

3. The vehicle heat exchanger arrangement according to claim 1, wherein
the heat exchanger is an engine radiator that receives a liquid coolant.

4. The vehicle heat exchanger arrangement to claim 1, wherein
the power recovery device includes a generator fan that generates electricity in response to the air rotating blades of the generator fan.

5. The vehicle heat exchanger arrangement to claim 4, wherein
the shroud includes a generator fan shroud section at least partially enclosing a space between the second side of the heat exchanger and the generator fan, the generator fan shroud section defining the outlet and the bypass outlet of the shroud.

6. The vehicle heat exchanger arrangement according to claim 4, wherein
the generator fan has a smaller effective cross-sectional area than an effective cross-sectional of the pusher fan.

7. The vehicle heat exchanger arrangement according to claim 4, wherein
the generator fan has a center rotational axis that is offset from a center rotational axis of the pusher fan.

8. The vehicle heat exchanger arrangement according to claim 4, further comprising
an additional generator fan disposed at the shroud at the second side of the heat exchanger to receive the air pushed through the heat exchanger by the pusher fan such that the additional generator fan generates electricity in response to the air rotating blades of the additional generator fan.

9. The vehicle heat exchanger arrangement according to claim 4, wherein
the generator fan is electrically coupled to the pusher fan to supply electrical power generated by the generator fan to the pusher fan.

10. The vehicle heat exchanger arrangement according to claim 9, wherein
the generator fan and the pusher fan are part of a DC voltage electrical circuit in which the generator fan and the pusher fan are connected in parallel.

11. A vehicle heat exchanger arrangement comprising:
a heat exchanger having a first side and a second side;
an electrically powered pusher fan disposed on the first side of the heat exchanger to push air through the heat exchanger to the second side;
a generator fan disposed on the second side of the heat exchanger to receive the air pushed through the heat exchanger by the pusher fan such that the generator fan generates electricity in response to the air rotating blades of the generator fan, the generator fan being electrically connected to the pusher fan to supply electrical power generated by the generator fan to the pusher fan.

12. The vehicle heat exchanger arrangement according to claim 11, wherein the generator fan and the pusher fan are part of a DC voltage electrical circuit in which the generator fan and the pusher fan are connected in parallel.

13. The vehicle heat exchanger arrangement according to claim 11, wherein the generator fan has a center rotational axis that is offset from a center rotational axis of the pusher fan.

14. The vehicle heat exchanger arrangement according to claim 11, further comprising a shroud having an inlet, an outlet and a bypass outlet, the heat exchanger being disposed within the shroud having the first side of the heat exchanger facing the inlet and the second side of the heat exchanger facing the outlet and the bypass outlet, and the pusher fan is disposed at the inlet of the shroud and the generator fan is disposed at the outlet of the shroud.

15. The vehicle heat exchanger arrangement to claim 14, wherein the shroud includes a pusher fan shroud section at least partially enclosing a space between the pusher fan and the first side of the heat exchanger, the pusher fan shroud section defining the inlet of the shroud.

16. The vehicle heat exchanger arrangement to claim 14, wherein the shroud includes a generator fan shroud section at least partially enclosing a space between the second side of the heat exchanger and the generator fan, the generator fan shroud section defining the outlet and the bypass outlet of the shroud.

17. The vehicle heat exchanger arrangement according to claim 14, further comprising an additional generator fan disposed at the shroud at the second side of the heat exchanger to receive the air pushed through the heat exchanger by the pusher fan such that the additional generator fan generates electricity in response to the air rotating blades of the additional generator fan.

18. The vehicle heat exchanger arrangement according to claim 14, wherein the shroud includes a bypass member disposed over the bypass outlet and is configured to move between a closed position covering the bypass outlet and an open position, the bypass member being arranged to selectively discharge the air pushed through the heat exchanger by the pusher fan out of the bypass opening.

19. The vehicle heat exchanger arrangement according to claim 18, further comprising a controller configured to automatically operate opening and closing of the bypass member in response to cooling demand conditions.

* * * * *